March 3, 1970 R. C. LARSON 3,498,536
CONDITIONING SYSTEM
Filed May 7, 1968 3 Sheets-Sheet 1

INVENTOR
RICHARD C. LARSON
BY Mason, Fenwick & Lawrence
ATTORNEYS

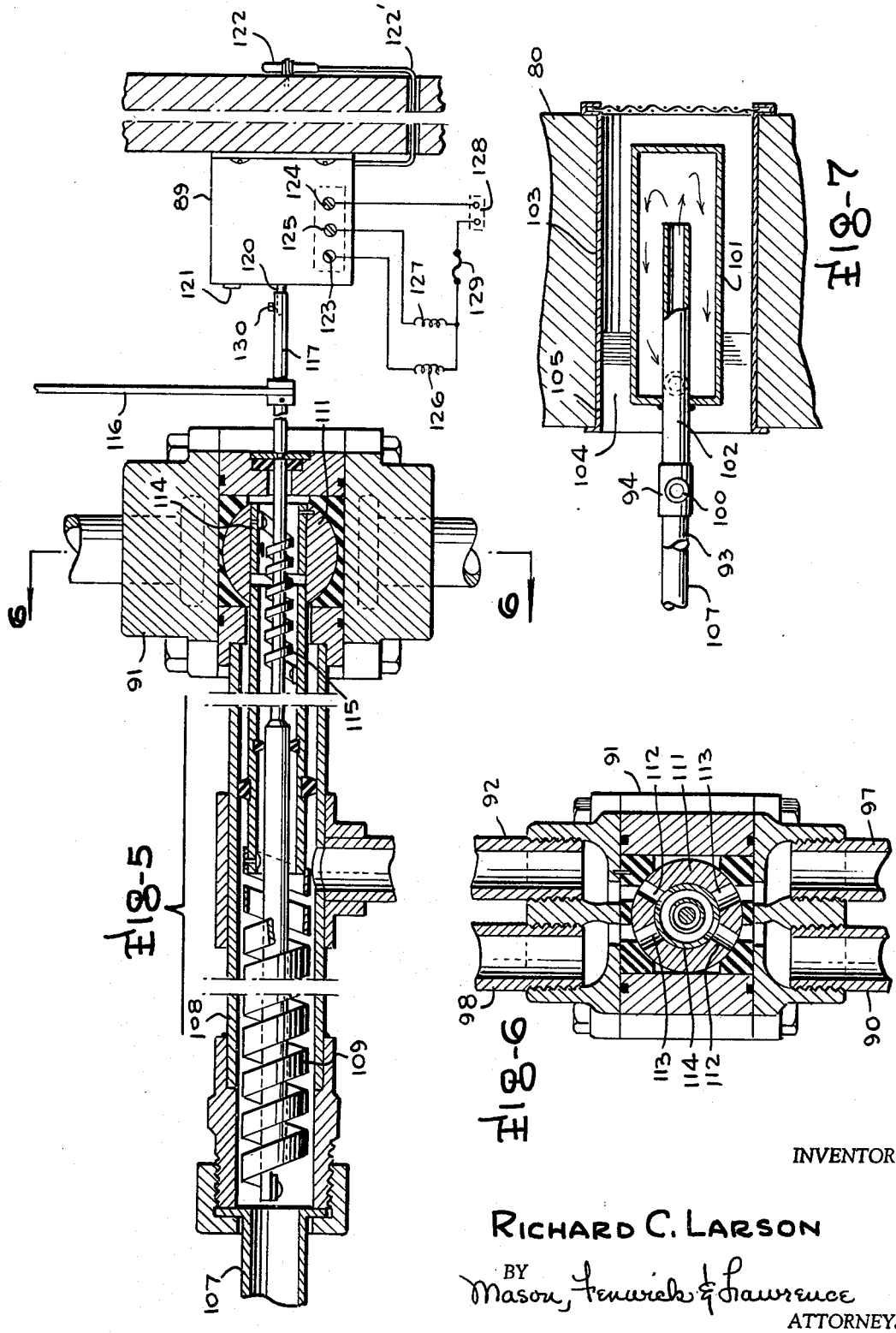

United States Patent Office 3,498,536
Patented Mar. 3, 1970

3,498,536
CONDITIONING SYSTEM
Richard C. Larson, 4420 Great Oak Road,
Rockville, Md. 20853
Filed May 7, 1968, Ser. No. 727,214
Int. Cl. G05d *23/00;* F16k *11/00*
U.S. Cl. 236—1　　　　　　　　　　　　　　　10 Claims

ABSTRACT OF THE DISCLOSURE

Conditioning system for buildings with three or four pipe mains supplying and returning heated and cooled fluids to all areas, and branch systems in each area admitting heated or cooled fluid in accordance with a predetermined outside temperature level to an automatic valve which modulates the flow of selected fluid to a radiator. The automatic valve is controlled by the temperature of returning spent fluid subjected to area temperature and outside temperature. The automatic valve and a thermostat subject to outside temperatures are set simultaneously. A branch from the cooled fluid line goes to a humidifier controlled automatically by a humidistat.

REFERENCE TO RELATED APPLICATION

This application is related to my co-pending application Ser. No. 525,057, filed Feb. 4, 1966, entitled Automatic Temperature Responsive Control Valve, now Patent No. 3,385,520.

BACKGROUND OF THE INVENTION

This invention relates to area conditioning systems wherein a radiator control valve, of the type disclosed in my above mentioned Patent No. 3,385,520, is used to switch from a cooling to a heating medium and return, and control the amount of heating or cooling fluid admitted to the radiator.

In a continuing effort to provide year around indoor comfort, man first used open fires in individual areas, then central heating systems and, finally, combination heating and cooling systems. Even with the most sophisticated combination systems in present use, there is no automatically controlled system to maintain in each area of many serviced a predetermined, constant temperature and humidity conditioned atmosphere suited to the occupant of the area.

SUMMARY OF THE INVENTION

The general object of the present invention is to provide a system which will deliver to an area continuous heating or continuous cooling as required to maintain a constant temperature in the area, rather than cyclic heating or cooling with inherent over- and under-temperature periods to achieve a predetermined mean temperature.

Another object is to provide a system which will be capable of automatic change over from heating to cooling in each area of a multi-area system.

A further object is to control the entrance of heating or cooling medium into the individual area radiators in accordance with outside climatic conditions to precondition the area system in advance of its need to maintain its desired temperature level.

It is also an object of the invention to provide a system which controls the temperature, the maximum relative humidity, and the amount of fresh air which is admitted continually to any particular area of a multi-area system.

Still another object is to provide a system in which each area can be pre-set to govern heating and cooling, and which acts to set an outside thermostat for that area to control admission of the heating or cooling medium to the area radiator.

Another object of the invention is to provide a system of multi-areas with each area having a thermostatic valve responsive to a composite temperature which results from the temperature of immediately adjacent outside air, the temperature of area air sweeping the spent fluid pipe and the temperature of the spent fluid.

A further object is to provide a system having means to create a chimney effect to draw fresh air from outside into the area.

Yet another object is to provide a system in which relative humidity is maintained at a predetermined maximum by use of the cooling fluid supply, but which operates independently of the heating or cooling of the area.

Other objects of the invention will become apparent from the following description of practical embodiments thereof, when taken in conjunction with the drawings which accompany, and form part of, this specification.

BRIEF DESCRIPTION OF THE DRAWINGS

FIGURE 5 is a vertical section, shown on an enlarged scale, and illustrating the automatic control valve and its connection to an outside thermostat;

FIGURE 6 is a vertical section through the automatic control valve, taken on the line 6—6 of FIGURE 5; and, FIGURE 7 is a horizontal section through a portion of the area outside wall, and is taken on the line 7—7 of FIGURE 4.

DESCRIPTION OF THE PREFERRED EMBODIMENTS

In general, the invention concerns a heating system which includes a radiator for heating and cooling, or a radiator for heating and a radiator for cooling, and which has a constant supply of heating fluid and cooling fluid available for circulation through the radiators. Valves controlled by outside temperature allow heating medium or cooling medium to flow through the respective radiators, and a valve of the type disclosed in the above-mentioned patent, controlled by a composite temperature resulting from outside air temperature, spent fluid temperature and area temperature sweeping the spent fluid pipe, modulates the flow of the selected conditioning medium through the respective radiator. The system also utilizes the cooling fluid to maintain a predetermined, pre-set maximum humidity. The system is designed to serve many areas, and each area will have its automatic control valve to maintain selected atmospheric conditions within the area, irrespective of conditions in other areas.

Figure 1:
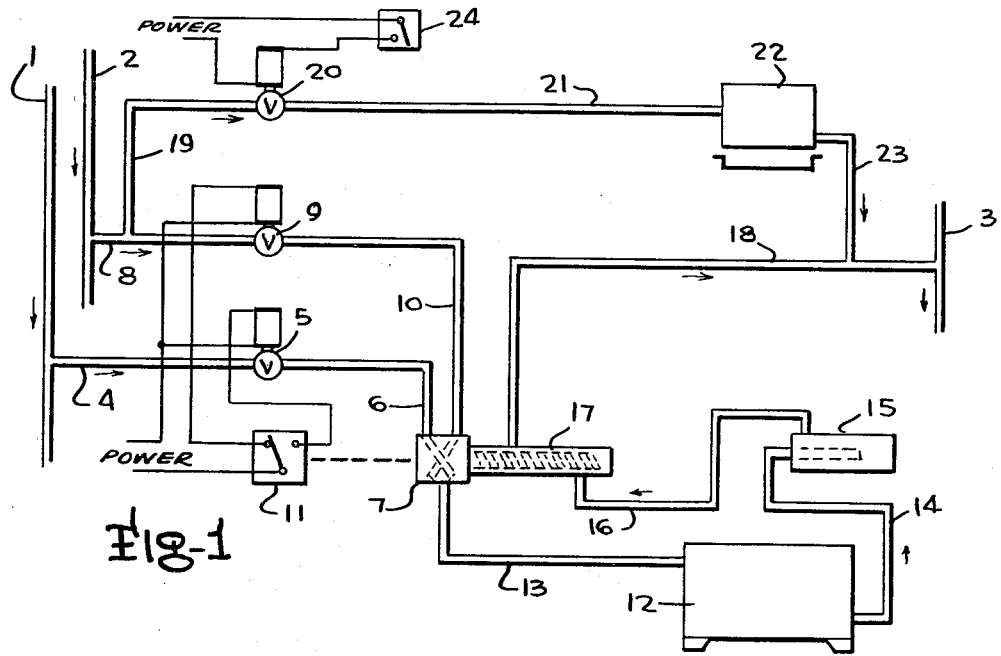
FIGURE 1 is a schematic view of one form that the present invention may take.

Referring to the drawings in detail, FIGURE 1 illustrates schematically a three pipe system including the control features of the present invention. The system includes a supply pipe 1 for a heated fluid, a supply pipe 2 for a cooled fluid and a common return line 3. Lines 1 and 2 lead from any suitable units (not shown) for heating and cooling the fluid, and heated and cooled fluid will be maintained in the pipes, under pressure, at all times. The pipes will extend throughout the building to be serviced. Return line 3 will bring the spent fluid to the means for heating and cooling the fluid supplied by lines 1 and 2.

At each individual area within the building, branch lines will be tapped from the common lines 1, 2 and 3, and the entire conditioning equipment for controlling the individual area will be located between the branches from the supply lines 1 and 2 and the branch to the return line 3. Individual area conditioning systems, such as shown in FIGURE 1, will be located in each area of the multi-area building, and each area system will bridge the common supply lines and return line.

Branch 4 from heated fluid supply line 1 leads to a solenoid valve 5 and, from the solenoid valve, the heated fluid passes through line 6 to an automatic valve 7 of the type disclosed in the above-mentioned patent. The cooled fluid is drawn from supply line 2 through branch 8 to a solenoid valve 9 and, from valve 9, the cooled fluid passes through line 10 to the automatic valve 7. The valves 5 and 9 are connected to a thermostat 11 located or having its temperature responsive element located outside the building immediately adjacent the area to be conditioned. Thermostat 11 controls the valves 5 and 9 in opposite phase in accordance with a pre-set temperature level. In other words, the thermostat will act to open valve 5 and close valve 9 when the outside temperature is below the thermostatic setting, and open valve 9 and close valve 5 when the temperature rises above pre-set temperature. Thus, the control valve will be supplied with heated fluid or cooled fluid in accordance with the temperature outside the particular area. Automatic valve 7 has its temperature setting means, as fully disclosed in the above-mentioned patent and as will be more fully described hereinafter, and the setting means of the automatic valve and thermostat 11 are mechanically coupled, so that when the automatic valve temperature is set for the degree desired within the area, the outdoor thermostat will also be set, so as to automatically supply heated fluid or cooled fluid as dictated by outside temperature to maintain the area temperature at the desired level. Fluid admitted to the valve 7 will be supplied as required to a radiation unit 12 through line 13, and the unit 12 will transfer the heat or cold of the fluid to the area. Spent fluid will pass through line 14 to a climate sampler 15 which will be located so as to be bathed by fresh air being brought into the area. The spent fluid, having been subjected to the temperature of the area air flowing across the line 14 and the fresh air in the climate sampler 15, will pass by means of line 16 to the thermodynamic helix 17 which is the control unit of the automatic valve 7, and is actually a part of that valve. The spent fluid then passes through line 18 to the common return line 3.

In areas of high humidity, it is desirable to employ a branch 19 from the line 8 leading to a solenoid valve 20. From valve 20, a line 21 leads to a dehumidifier 22, and from the dehumidifier a line 23 leads to the line 18 for return through the common line 3. Valve 20 is electrically connected to a humidistat 24 of any conventional type. When the humidity in the area exceeds a level for which the humidistat has been set, the valve 20 is opened to allow cooled fluid to pass through the dehumidifier 22 to condense excess moisture from the atmosphere.

The system of FIGURE 1 maintains a constant supply of heated fluid and cooled fluid at each of the areas to be conditioned. These fluids are fed to the automatic valve 7 as required by temperature outside the area, with the thermostat 11 causing the system to shift from heating to cooling and return as the temperature rises above or falls below the temperature for which the thermostat 11 has been set. The supplied fluid is then metered, or modulated, in its flow to the radiation unit 12 by the valve 7, with the rate of flow being determined by the temperature of the spent fluid after it has been subjected to the flow of area air temperature and incoming fresh air temperature. The prevailing temperature within the area will remain constant, rather than fluctuate from a predetermined high to a predetermined low and back, as is the case of systems with conventional wall-mounted thermostats. At any time that the humidity goes above the predetermined maximum, regardless of whether the system is operating on cooled fluid or heated fluid, the humidistat will open the valve 20 admitting cool fluid to the dehumidifier 22 to condense the excess moisture. Although the humidifier operates separately from the automatic control valve 7, it operates in conjunction with the remainder of the system to maintain the air condition that which is most comfortable for the occupant.

Figure 2:
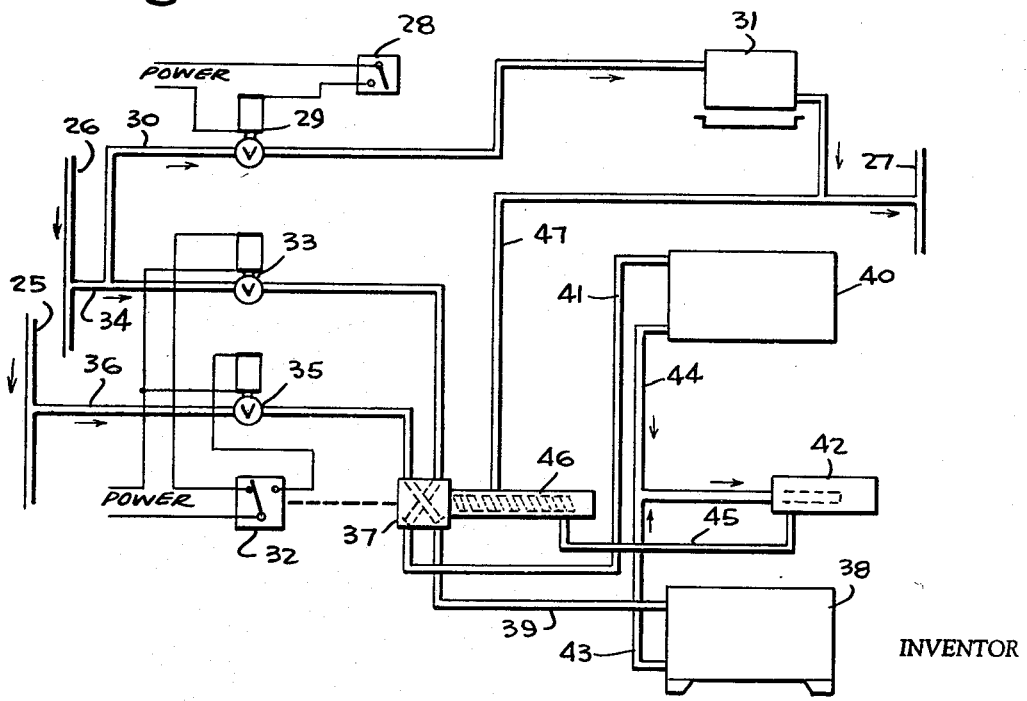
FIGURE 2 is a schematic view of another arrangement that the system may take.

FIGURE 2 shows another example of a three pipe system. The only difference between this system and that such described lies in the use of separate radiation means for heating and cooling.

In the FIGURE 2 system, the heated fluid is supplied by a conduit 25; the cooled fluid is supplied by a conduit 26; and, the return line for spent fluid is shown at 27. A humidistat 28 controls a valve 29 in a branch line 30 for cooled fluid, so as to control flow of the cooled fluid to a dehumidifier 31. An outdoor thermostat 32 controls valve 33 in a cooled fluid line 34 and valve 35 in heated fluid line 36. Lines 34 and 36 connect to the automatic control valve 37. The fluids are fed by valve 37 to a heating radiator 38 through pipe 39, or to a cooling radiator 40 through pipe 41, depending upon which of the valves 33 or 35 is open to allow its fluid to flow into the automatic valve. The spent fluid from both radiators travels over the outdoor climate sampler 42 through the respective pipes 43 and 44. The spent fluid then moves through pipe 45 to the thermodynamic coil 46 of the automatic valve 37, and through pipe 47 to the spent fluid conduit 27. Aside from the separate radiation, this form of the system operates exactly as the first-described form.

Figure 3:
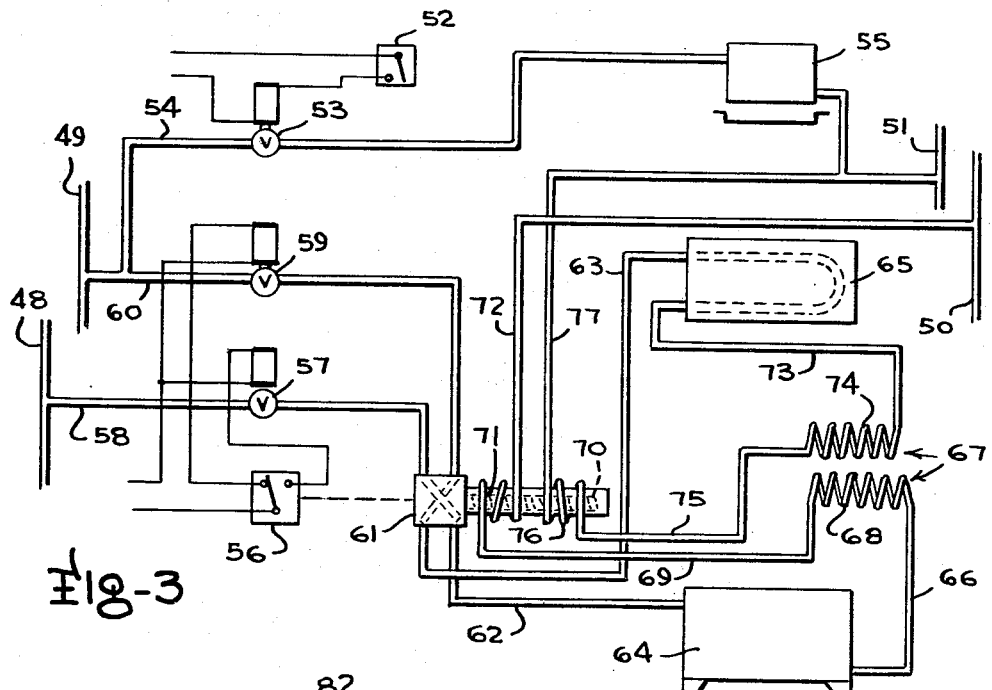
FIGURE 3 is a schematic view of still another layout of component parts that the invention may use.
Figure 4:
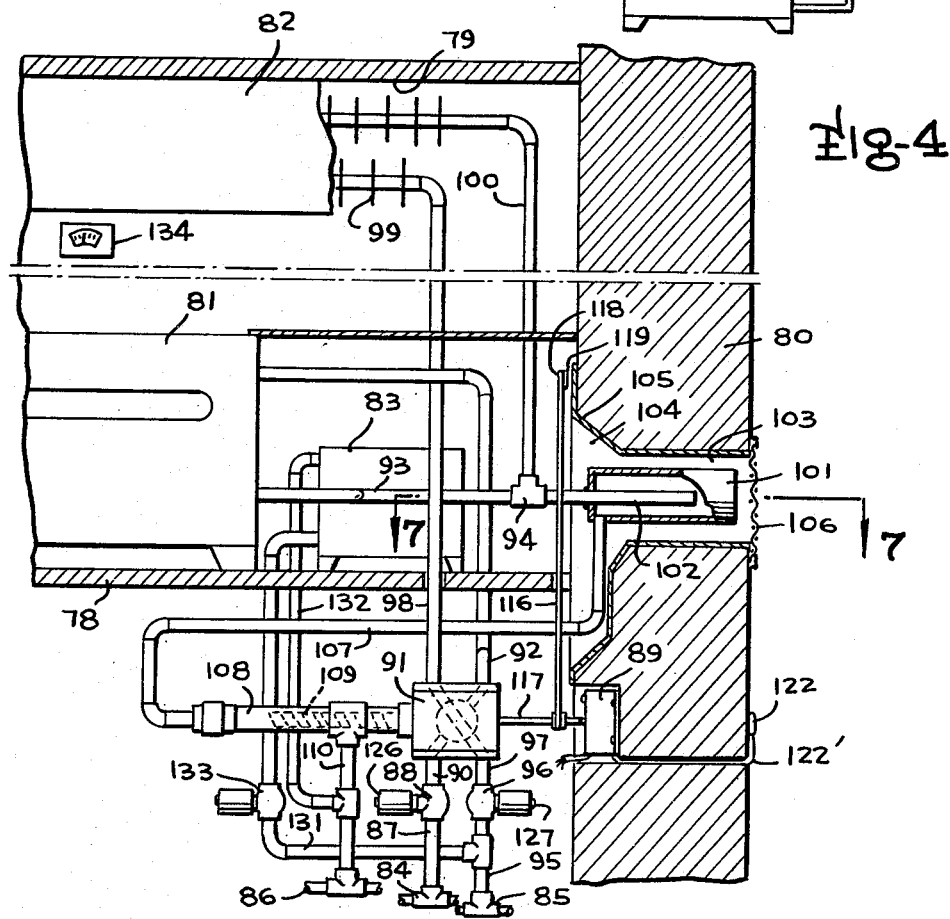
FIGURE 4 is a somewhat schematic vertical section of an area to be conditioned, with the various components of the area system in position.

The system shown in FIGURE 3 differs from the one just described in using a four pipe main circulating system so that each fluid will have its own pipe for supply and its own pipe for return of spent fluid. There are two supply lines, a line 48 for fluid for heating and a line 49 for fluid for cooling. There is also a spent heating fluid return line 50 and a spent cooling fluid return line 51. By adding separate return lines for the two fluids, fluids of different character can be used. For example, hot water may be used as the heating fluid and Freon as the cooling medium. As only one of the fluids is flowing through an area system at a time, these fluids will be maintained separate.

The system of FIGURE 3 has humidistat 52 controlling a valve 53 and a branch line 54 from the cooling fluid supply, so as to regulate the flow of the fluid through the dehumidifier 55. The outside thermostat 56 controls valves 57 in the heating line 58 and valve 59 in the cooling line 60. The lines 58 and 60 lead to the automatic control valve 61. Lines 62 and 63 respectively run from the automatic valve to a heating radiator 64 and a cooling radiator 65. A line 66 carries the spent heating fluid from radiator 64 to outdoor climate sampler 67 where it flows through heat exchanger 68 and pipe 69 which is exposed to the flow of area air temperature and now conditions thermodynamic helix 70, which is the control unit of the automatic valve 61, by passing through heat transfer coil 71. The spent heating fluid then passes through line 72 to the heater fluid return line 50. A similar line 73 leads from the cooling radiator 65 to the climate sampler 67, the heat exchanger coil 74, the area exposed line 75, the helix conditioning heat transfer coil 76, and line 77 leading to the return line 51 for the spent cooling fluid.

FIGURES 4 to 7 illustrate one physical form which the system shown in FIGURE 2 may take. The component parts of the system are shown as arranged in an area to be conditioned, the area having a floor 78, a ceiling 79 and an outside wall 80. The area is heated by a baseboard radiator 81, and is cooled by a valance cooler 82. The dehumidifier is shown as housed within a unit 83 adjacent the baseboard radiator 81.

Fluid is fed to the carrier system by means of heated fluid conduit 84 and cooled fluid conduit 85, and the spent fluids from the area system is returned or reheating or recooling by the spent fluid return conduit 86. A branch line 87 from the heated fluid conduit 84 leads to a solenoid control valve 88 operated by means of a thermostat 89 positioned, or having its temperature responsive element positioned, outside the building. Thermostat 89 may be of the type manufactured by Honeywell, Inc., Model T675 A1508, or a similar one. A pipe 90 leads from valve 88 to the automatic control valve 91. From valve 91, the heating fluid is carried by pipe 92 to one side of the radiator 81. The opposite side of the radiator is connected to a pipe 93 coupled to a T-fitting 94.

A branch line 95 from cooled fluid conduit 85 leads to a solenoid valve 96, also controlled by the outside thermostat 89. A pipe 97 connects valve 96 with the automatic control valve 91. A pipe line 98 leads from valve 91 to one leg of a coil 99 in the valance cooler unit 82. The other leg of the coil is connected by a pipe 100 to the T-fitting 94. Thus, the return lines from both the coil within the baseboard radiator and the coil within the valance cooler are connected to the T-fitting 94.

Spent fluid, whether it be heating fluid or cooling fluid, flows from the T-fitting 94 into an outdoor climate sampler 101 by means of pipe 102. Sampler 101 is a cylindrical member of considerably larger diameter than pipe 102, and pipe 102 empties its spent fluid into the chamber within the sampler. By reason of the increased diameter, more surface space is provided for heat transfer than would be possible with the normal spent fluid line. Sampler 101 is located within an opening 103 in the outside area wall 80. Opening 103 is circular in cross section, and has a vertically flared inner end 104 to create a chimney effect so that outside air will be drawn through the opening 103 into the room. The incoming outside air will flow over the entire outer surface of the sampler 101. The opening 103 may have a metallic liner 105, and a screen 106 can be across the outer end of the opening to prevent insects from entering the area.

Spent fluid flows from sampled 101 through a pipe 107 which is connected to the end of the tubular housing 108 of the automatic valve 91 which contains the thermodynamic helix 109 of the automatic valve. A pipe 110 is connected to the tubular housing 108 and carries the spent fluid from the housing 108 to the spent fluid return conduit 86. This completes the circuit of the fluids through the system.

While the above-referred to patent shows the automatic control valve 91 in all of its detail, it would be well to state here that flow of fluid through the valve is controlled by a ball 111 under the influence of the thermostatic helix 109. The ball has a pair of passageways 112 and 113, angularly arranged to permit the flow of heating or cooling fluid from the respective supplies to the lines leading to the baseboard radiator or valence cooler. Selection of the passageway to be used is under the control of the sleeve 114, which opens one of the passageways and closes the other as dictated by a second thermostatic helix 115 which is in the path of flow of incoming fluid. As described in the above-mentioned patent, if heated fluid is entering the control valve, passage 112 will be opened, and if cooled fluid is entering the valve passage 113 will be opened.

Automatic valve 91 is set to provide proper flow of fluid as required for the set temperature, by means of of a setting arm 116, connected to rod 117 which controls the position of the thermodynamic helix 109. The arm may be movable over a scale fixed to the area wall, or the arm may carry a scale 118 for use in conjunction with a marker 119 on the area wall. Rod 117 is fixed coaxially to a temperature setting rod 120 of the thermostat 89, after the usual setting knob of the thermostat has been removed. The degree of angular turn per temperature unit of setting rod 120, as indicated on the thermostat scale 121, will correspond precisely with the degree of angular turn of rod 117 for the same temperature unit, as indicated on scale 118. Consequently, movement of arm 116 will adjust the setting of valve 91 and thermostat 89 similarly and simultaneously, and after adjustment, scales 118 and 121 will have the same reading.

Thermostat 89 is controlled by an outside bulb 122, connected to the thermostat by a tube 122′ extending through the building wall. The particular thermostat identified above is a diaphragm type, and pressure changes cause the diaphragm to actuate a snap-action switch to close in alternation contacts 123 and 124, and contacts 124 and 125. (See FIGURE 5). When contacts 123 and 124 are bridged, coil 126 of valve 88 will be energized and valve 88 will be opened. Coil 127 of valve 96 will be deenergized and valve 96 will be closed. When contacts 124 and 125 are bridged, coil 126 will be deenergized, valve 88 will be closed, coil 127 will be energized and valve 96 will be open. Valves 88 and 96 may be normally closed valves, open only when their coils are energized, such as those manufactured by International Telephone and Telegraph Corporation, identified as Type K171. These are Servo-operated piston type valves for positive on/off control of fluids.

The diagram in FIGURE 5 shows a simple hook up from the thermostat connections 123, 124 and 125 to the solenoid coils 126 and 127 and to the power terminals 128. A fuse 129 is shown in the circuit.

With the above-described valves and thermostatic control, one or the other of the valves 88 or 96 will be open at all times and the other will be closed. Since the fit of the sleeve 114 with respect to the bore of ball 111 is such as to allow a water film between their surfaces, there will always be a fluid flow in one or the other of the radiation units 81 and 82. When valve 91 is closed, because the temperature of the area is what the system is set for, a small amount of fluid will still be flowing through the system. This eliminates loss of pressure of the fluid, and holds the temperature of the radiation unit, or starts to change the temperature of those units as outside temperature dictates. It also insures that helix 115 is always bathed in the presently flowing fluid.

The system is not restricted to the aforementioned specific thermostat and solenoid valve. Helix 109 can be designed to accommodate other thermostats for a direct one-to-one connection as with set screw 130 which fixes rod 120 to rod 117; or, compensating gear trains may be used between the rods for rotation of the rods to accommodate designs of helix 109 and other thermostats. Solenoid valves 88 and 96 could be replaced with other types or with a single three-way solenoid valve with two inlet ports and one outlet port, with the cap of valve 91 being replaced by one with a single outlet, as disclosed in the above-mentioned patent.

In the above description a one degree temperature differential set thermostat 89 was used. There are other models differing only in that the temperature differential can be adjusted. For a poorly constructed area or for an area with a large window/wall ratio a temperature differential of, say, three degrees would protect the anticipatory feature of the heater-cooler area changeover of the system which, of course, works in conjunction with the outdoor-climate-sampler and valve 91 to anticipate climate changes.

Solenoid valves 88, and 96 are installed and operated according to the manufacturer's instructions. Likewise, thermostat 89, with the normal adjusting knob removed has its adjusting rod 120 slaved to rod 117.

The dehumidifier unit 83 is supplied with cooling fluid through a pipe 131 leading from branch line 95, at a point ahead of the location of valve 96. After passing through unit 83, the fluid is returned to the spent cooling fluid line 86 by means of pipe 132. Thus, cooled fluid is available for use in the dehumidifying unit at all times, irrespective of whether valve 96 is opened or closed. The dehumidifier unit is a conventional unit, operative to condense excess moisture in the atmosphere whenever the moisture content rises above a predetermined maximum. The flow of the cooled fluid to unit 83 is controlled by a valve 133 in pipe line 131, and the valve, in turn, is controlled by a conventional humidistat 134. Valve 133 may be identical to valves 88 and 96.

In operation of the device, heated fluid and cooled fluid will be available in the conduits 84 and 85 to all of the areas in the building to be conditioned. Each area will have its automatic valve 91 set to the desired temperature for the area by adjustment of the setting arm 116. As the setting rod 120 of the outside thermostat 89 is also connected to the control rod 117 of the automatic valve, the setting of the automatic valve will simultaneously set the outside thermostat for the temperature which is to govern the admission of heated or cooled fluid to the area system. For example, if the area is to be maintained at 70 degrees, the outside thermostat will be set for 70 degrees and when ever the temperature is above 70 degrees this thermostat will act to close solenoid valve 88 to shut off the supply of heated fluid from the system and open the valve 96 to permit cooled fluid to flow to the automatic valve. When the temperature drops below 70 degrees, the cooled fluid line is closed and the heated fluid line is opened. Thus, the fluid required by outside temperature conditions for maintaining the area at the desired level will be automatically available to the area system. The admission of heated or cooled fluid to the automatic valve serves to cause the thermostatic helix 115 to operate to rotate sleeve 114 to direct the fluid to the pipes leading to the heating radiator or to the cooling coils as required. After the automatic valve is properly set for the fluid going through it, the flow of fluid is modulated in accordance with needs by the thermostatic helix 109. This latter helix is continuously bathed in return spent fluid which has been subjected to the temperature of the room air as it flows through the pipes leading from the radiator or valance cooler to the outside climate sampler 101, and to the flow of outside air around the sampler 101 in the outdoor inlet opening 103. Thus, the selection of fluid is automatic as required by outside temperature conditions, and the rate of flow of the selected fluid is automatically controlled in accordance with the rate of heat exchange of the fluid in its radiator as modified by the temperature of the area air and outside air. At any time, the humidifier may operate if the humidity in the area exceeds the predetermined maximum.

The system is a year-round, occupancy-ready, heating-cooling system for each area in a multi-area building which is continuous in its operation. This maintains a more even temperature and eliminates expansion devices and equipment over-sizing in order to bring an area temperature quickly to the required degree after an off period in the on-off systems. The sensitivity of the device is such that it responds to changes so quickly that the functional imbalance of the system with respect to the set conditions is too small for occupant detection. The system can be adapted to practically all new and old buildings alike. The radiation, pipes, and fluids used can be most any of those in conventional use. The fluid flow is in a closed circuit, so that replacement, or addition, is substantially eliminated.

While in the above several modifications of the invention have been disclosed, it will be understood that the structural details shown and described are merely by way of example and the invention may take other forms within the scope of the appended claims.

What is claimed is:
1. A conditioning system comprising, means to supply continuously heating medium and cooling medium to all parts of a building to be conditioned, means to return spent heating and cooling medium, radiator means at each individual area to be conditioned in the building, a control valve at each area to control flow of heating medium and cooling medium to the radiator means, branch lines from the heating medium and cooling medium supply means to the control valve, means in the branch lines to selectively open and close the respective branch lines to admit heating medium or cooling medium to the control valve, means responsive to outside temperature to operate the means in the branch lines in accordance with variations from a pre-elected outside temperature, a branch line from the radiator means to the spent medium return means, and means in the spent medium branch line to operate the control valve to control the flow of selected medium through the control valve.

2. A conditioning system as claimed in claim 1 wherein, the means responsive to outside temperature and the means in the spent medium branch line to control the flow of selected medium through the control valve are adjustable and interconnected for simultaneous operation.

3. A conditioning system as claimed in claim 1 wherein, the branch line from the radiator means anterior to the means to control the control valve is so located as to be bathed by area air and outside air.

4. A conditioning system as claimed in claim 3 wherein, the means in the branch lines to control flow of medium to the control valve are valves in the respective branch lines, and the means responsive to outside temperature is an outside thermostat.

5. A conditioning system as claimed in claim 3 wherein, there is a humidifier, a humidifier branch line from the cooling medium supply means to the humidifier and to the spent medium return means, a valve in the humidifier branch line to control flow of cooling medium, and a humidistat subject to area atmosphere to control the humidifier branch line valve.

6. A conditioning system as claimed in claim 3 wherein, the location of the branch line from the radiator means to bathe the line with outside air includes, an opening in the area outside wall to admit outside air, and a portion of the branch line from the radiator means within the opening.

7. A conditioning system as claimed in claim 6 wherein, the opening in the area outside wall is flared inwardly at least in part to create a chimney effect to draw in outside air.

8. A conditioning system as claimed in claim 3 wherein, there is a second radiator means, a line from the control valve to the second radiator means, a line from the second radiator means connected to the branch line from the first mentioned radiator means, and means in the valve responsive to the admission of heating medium to direct heating medium to the first mentioned radiator means and responsive to the admission of cooling medium to direct cooling medium to the second radiator means.

9. A conditioning system as claimed in claim 8 wherein, the connection of the line from the second radiator means to the line from the first-mentioned radiator means is anterior to the location of the return medium line bathed by area air and outside air.

10. A conditioning system as claimed in claim 9 wherein, there is a humidifier, a humidifier branch line from the cooling medium supply means to the humidifier and to the spent medium return means, a valve in the humidifier branch line to control flow of cooling medium, and a humidistat subject to area atmosphere to control the humidifier branch line valve.

References Cited

UNITED STATES PATENTS

| | | | |
|---|---|---|---|
| 1,993,288 | 3/1935 | Smith | 165—22 |
| 2,344,555 | 3/1944 | McGrath | 165—22 X |
| 3,385,520 | 5/1968 | Larson | 236—10 |

EDWARD J. MICHAEL, Primary Examiner